Dec. 24, 1946. W. K. O'LOUGHLIN 2,413,153
PROCESS FOR CATALYTIC HYDROGENATION OF ALIPHATIC NITROHYDROXY COMPOUNDS
Filed March 26, 1943
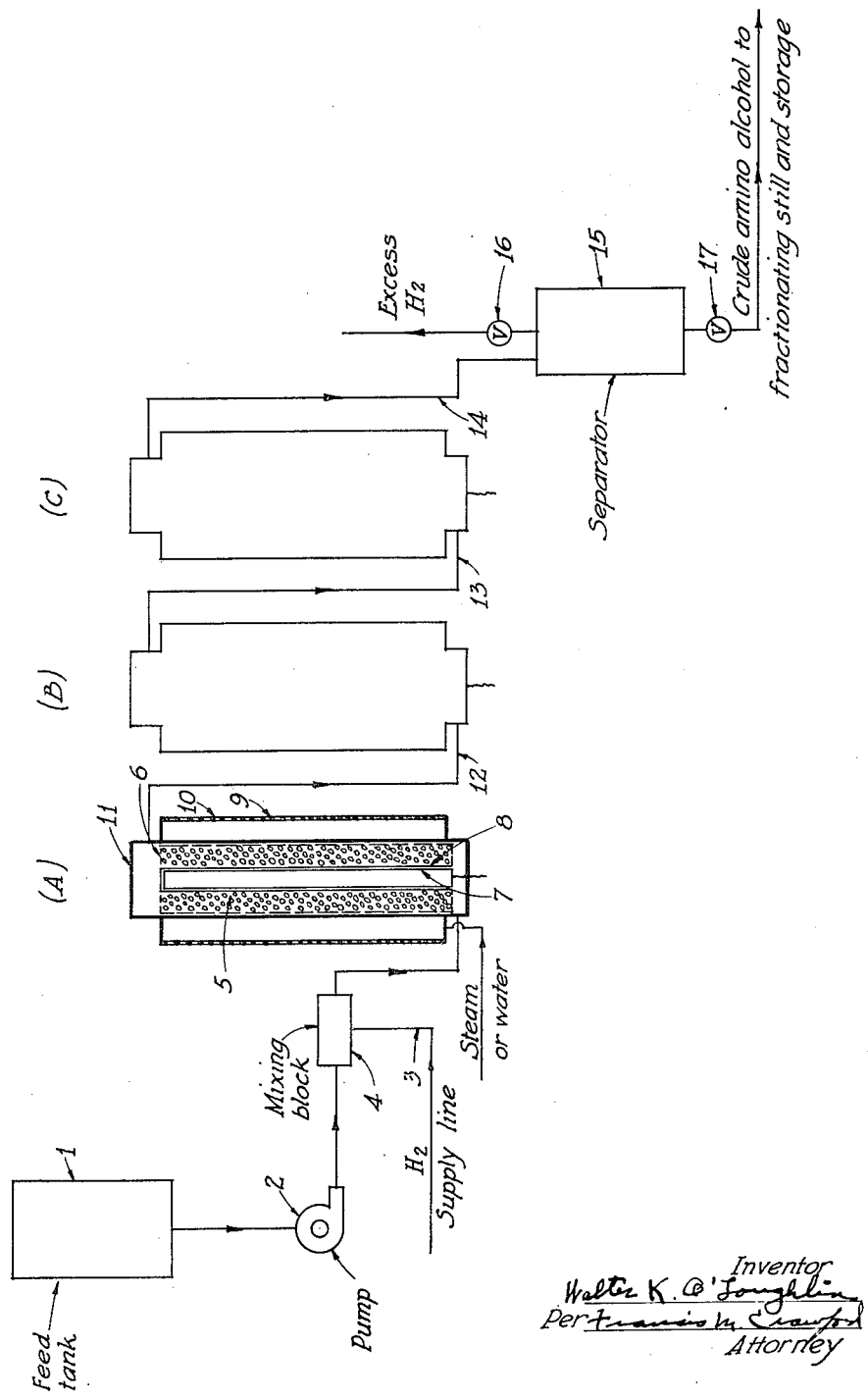
Inventor
Walter K. O'Loughlin
Per Francis M. Crawford
Attorney Patented Dec. 24, 1946

2,413,153

UNITED STATES PATENT OFFICE 2,413,153

PROCESS FOR CATALYTIC HYDROGENATION OF ALIPHATIC NITROHYDROXY COMPOUNDS

Walter K. O'Loughlin, Terre Haute, Ind., assignor to Commercial Solvents Corporation, Terre Haute, Ind., a corporation of Maryland Application March 26, 1943, Serial No. 480,664

8 Claims. (Cl. 260—584)

My invention relates to a catalytic hydrogenation process, and more particularly to an improved process for the continuous catalytic hydrogenation of aliphatic nitrohydroxy compounds to the corresponding amino derivatives.

For some time, catalytic hydrogenation methods have been employed to convert various unsaturated organic compounds to their corresponding saturated derivatives. An outstanding example of this general procedure, and one which is employed commercially, is that of hardening oil. Generally such catalytic processes have been found to be considerably more economical and efficient than competitive processes based upon the use of chemical reducing agents, such as metallic sodium, zinc dust, iron powder and the like.

Ordinarily the standard procedure for effecting catalytic hydrogenation consists essentially of suspending a metallic catalyst in a liquid medium together with the material to be hydrogenated, and agitating the mixture with hydrogen gas, under pressure, until the required quantity of hydrogen has been absorbed. This method is known as the batch process and possesses the advantage that sufficient time may be allowed for the process to reach any desired stage of completion. It has the disadvantage, however, that the process is discontinuous and, hence, more costly than if the equipment could be kept in constant use. Continuous hydrogenation involves so many serious technical difficulties that its use has, in the past, been largely confined to gaseous system. One of the chief drawbacks characteristic of former continuous catalytic liquid-phase hydrogenation methods has been that the suspended catalyst, upon being circulated throughout the system, tends to agglomerate and clog the apparatus, thereby necessitating periodic shut-downs, so that the clogged areas in the system can be cleaned out and the latter again be made operative.

It has been observed by others that continuous reduction of nitrohydroxy compounds may be effected by contacting a solution thereof with a solid stationary black nickel catalyst having a catalyst activity of 1.6–1.8 at an initial hydrogenation temperature of between 40 and 55° C., and completing the hydrogenation at a temperature within the range of 80 and 100° C. Space velocities and pressures of between 0.1 and 1.0 per hour and 500 to 2000 pounds per square inch, respectively, are employed. The yields of aminohydroxy compounds obtained by this procedure, in general, will be found to vary between 45 and 50 per cent of the theoretical amount.

I have now discovered that the yields of amino hydroxy compounds obtainable by the above-mentioned process may be substantially increased by modifying the manner in which the solution of the nitrohydroxy compounds to be hydrogenated is introduced into the reaction chamber. Such modification consists essentially of introducing the said nitrohydroxy compounds together with an excess of hydrogen under pressure at the bottom of a vertically positioned reaction chamber and permitting said solution to rise in the chamber covering the stationary catalyst, and finally being withdrawn from the top of the said chamber to obtain a solution in which the nitrohydroxy compound, originally present therein, has been substantially completely converted into the corresponding amino derivative.

The accompanying drawing illustrates diagrammatically a preferred design of apparatus that may be conveniently used in carrying out my process. The solution containing the nitro alcohol to be reduced is fed from tank 1 into mixing block 4 by means of pump 2 where it is mixed with hydrogen introduced through hydrogen supply line 3. Upon obtaining a mixture of nitro alcohol solution and hydrogen of the desired proportions (such mixture preferably contains excess hydrogen) said mixture is introduced at the bottom of hydrogenating unit A, which is maintained at a temperature of between about 40 and 45° C., the liquid-gas mixture passes upwardly over the pelleted catalyst 5 which is held in stationary position by Monel metal screen 6. The temperature is maintained at the desired level by means of a thermocouple 7 inserted in thermocouple well 8. Heat is supplied to the unit by circulating steam or water of the desired temperature through jacket 9, which is covered by insulating material 10. The assembly of catalyst basket, catalyst and thermocouple, is enclosed by a pressure-resisting cylindrical steel outer shell 11. When the mixture of amino alcohol, unreduced nitro alcohol and hydrogen reaches the top of unit A it enters feed line 12 and flows to unit B, which is identical in construction with unit A. The temperature at which the mixture passes through unit B, however, is generally preferably about 5 to 10° C. higher, i. e., 45 to 55° C., than that employed in the preceding unit. The solution containing the nitro alcohol is subjected to further hydrogenation in unit B, after which it flows through feed line 13 into unit C where reduction of the nitro alcohol is substantially completed at a temperature varying between about 80 and 100° C. The resulting mixture then flows through line 14 into separator 15 where excess hydrogen is vented to the atmosphere through valve 16. The crude amino alcohol thus obtained is removed from separator 15 through valve 17 to a suitable still where it is fractionated and the purified product collected.

The successful operation of my continuous hydrogenation process is largely dependent upon the selection of the proper type of catalyst, which in general should possess at least the following characteristics:

1. High catalytic activity.
2. High catalytic stability.
3. High mechanical stability.

By the term "high catalytic activity" I mean a hydrogenation catalyst having a catalyst activity of 1.6–1.8 as determined by the method described in United States Patent No. 2,174,510 (page 3, col. 1, l. 21–col. 2, l. 17). "High catalytic stability" refers to a catalyst which is not easily poisoned and which loses activity slowly. By "high mechanical stability," I means a catalyst which retains for long periods of time its original physical structure and is not, for example, quickly or readily eroded, powdered, or crushed.

The hydrogenation catalyst possessing the above combination of characteristics is employed preferably in the form of briquets, pellets, or grains of substantially uniform size and shape, and the stream of reactants is passed in an upwardly direction through the reaction chamber at a rate such that materials undergoing the catalyzed conversion remain in contact with the catalyst for sufficient but not extended periods of time. Thus the space velocity employed throughout both the initial and final stages of the reduction should preferably be maintained between the range of 0.1 to 1.0 per hour, and for any given operation, should be held at a substantially constant level. Also, in its practical application, my invention contemplates the separation, recovery and recycling of the unconverted nitrohydroxy compounds, as well as the unreacted hydrogen if desired.

While there are numerous commonly known hydrogenation catalysts possessing one or more of the above-mentioned properties, it is essential to the success of my process that the catalyst used therein possesses, to a substantial degree at least, all of the specified properties. I have, for example, investigated certain hydrogenation catalysts which are commonly known to possess the activity specified above and found that they disintegrate under the reaction conditions, and, within a short time, clog the apparatus to such an extent that the operation thereof must be discontinued, and the clogged areas freed of the powdered catalyst. On the other hand, hydrogenation catalysts of other types, which will remain in pellet form under the reaction conditions of my process, are not sufficiently active, at the temperatures employed, to render the process practical from the standpoint of economy.

A catalyst having the above specific properties which may be employed in my process can be conveniently prepared by mixing nickel carbonate or other reducible nickel compounds with a suitable inert material, such as, for example, alumina gel, silica gel, pumice, or kieselguhr and to this mixture is added a lubricant such as powdered graphite in order to facilitate the preparation of catalyst pellets in the pelleting machine. This composition is then converted into pellets of uniform size by means of any of several standard types of catalyst pelleting machines, and stored for use. The catalyst prepared in this form is introduced into a clean stainless metal basket. The basket filled with the pelleted catalysts, may be then placed in a suitable metal vessel capable of being heated and sealed off from the atmosphere. Gaseous hydrogen is next introduced into the vessel and slowly passed through the catalyst as the vessel is rapidly heated. The reduction of the nickel begins at a temperature in the neighborhood of 300° C., at which time the hydrogen flow is increased. When the temperature within the reaction vessel reaches approximately 350° C. the rate of heating is retarded, and the vessel slowly heated to a temperature in excess of 400° C., i. e., usually about 450° C., and maintained for a period of approximately one hour at the end of which time the catalyst is generally found to be in a substantially completely reduced state. The black nickel catalyst thus formed is then rapidly cooled while maintaining a flow of hydrogen thereover, and when the catalyst has cooled sufficiently, the hydrogen is replaced by nitrogen and the catalyst carefully transferred to the hydrogenation chamber which likewise contains nitrogen. Such precautions are necessary since the nickel catalyst obtained by above-described treatment is in a pyrophoric state and hence, contact with air must be avoided. An obvious and generally a preferable modification of the above-mentioned method for placing the catalyst employed in my process in active form, constitutes carrying out the reduction of the pelleted nickel salt containing mixture in the reaction chamber thus obviating the hazardous transfer of the reduced pyrophoric catalyst from one enclosed vessel to another.

The concentration of catalyst employed in my hydrogenation process may vary considerably, although for most purposes a concentration of between about 1 and 10 moles of active nickel per liter of solution, containing the nitrohydroxy compounds to be reduced will be found to be satisfactory; however, the particular concentration of catalyst employed in any given instance will depend at least partially on the concentration of the nitrohydroxy compound in solution. In general, the optimum concentration of nitrohydroxy compound has been found to be between 20 and 25 per cent, the balance consisting of an aqueous solution of either methanol or ethanol, of which the alcohol represents approximately 80 to 85 per cent of the total volume.

The operation pressures may also vary; however, for the majority of purposes I prefer to use hydrogen pressures within the range of 500 to 2000 pounds per square inch. The pressure employed is, within certain limits, governed somewhat by the temperature and in general, it will be observed that higher temperatures require lower pressures.

As a further generalization, it may be said that my process is applicable to the continuous hydrogenation of any aliphatic nitrohydroxy compound that is normally liquid or which may be dissolved in a solvent that is inert under the hydrogenation conditions employed, and it is to be specifically understood, in this connection, that the expression "nitrohydroxy compound" which appears in the appended claims should be construed to mean compounds having the aforesaid characteristics. Examples of such nitrohydroxy compounds are 1-nitro-2-ethanol, 2-nitro-1-propanol, 2-nitro-2-methyl-1-propanol, 2-nitro-3-methyl-1-butanol, 5-nitro-4-octanol, 2-nitro-2,4-dimethyl-3-pentanol, 2-nitro-1,3-propanediol, 2-nitro-2-methyl-1,3-propanediol, 2-nitro-1-ethyl-1,3-propanediol, 1-(1-nitrocyclohexyl)-1-pentanol and the like.

A typical application of my invention is illustrated by the specific example which follows; however, it is to be specifically understood that such example is not to be considered at all limitative, since as indicated above, my invention is generally adaptable to the continuous hydrogenation of any aliphatic nitrohydroxy compound.

Example I

Into a series of three vertical pressure-resisting cylindrical vessels of the type described, having a volume of 3200 ml. and filled with pelleted black nickel catalyst, was continuously introduced in an upwardly direction at a space velocity of 0.471 per hour, a solution containing 22 per cent 2-nitro-2-methyl-1-propanol, 66 per cent methanol, and 12 per cent water. The catalyst was present in each of said units in a concentration of 10 moles of active nickel per liter of solution, while a hydrogen pressure of 1000 pounds per square inch was employed throughout the reduction, the major portion of the hydrogenation being effected at a temperature of 41° C. However, when the reduction neared completion, as evidenced by the decreased rate of hydrogen absorption, the temperature was slowly increased to 82° C., at which value hydrogenation was continued until absorption of hydrogen ceased. As the crude 2-amino-2-methyl-1-propanol was produced, it was withdrawn from the top of the third reaction vessel through a suitable draw-off pipe to a separator, from which the excess hydrogen was vented to the atmosphere by means of a valve located at the top thereof, and the liquid product bled off to atmospheric pressure through a valve at the bottom of the separator. The crude product thus obtained was then distilled at atmospheric pressure, and the fraction boiling at 158–163° C., collected. This portion consisted of substantially pure 2-amino-2-methyl-1-propanol, and amounted to a conversion of 86.2 per cent. In a similar manner, 2-nitro-2-methyl-1,3-propanediol and 5-nitro-4-octanol were converted smoothly into their corresponding amino derivatives.

In order to demonstrate the efficiency of my process, as compared to continuous methods for hydrogenating such compounds involving the introduction of the nitrohydroxy compound to be reduced at the top of the hydrogenation chamber, the following example is included:

Example II

A solution containing 22 per cent 2-nitro-2-methyl-1-propanol, 66 per cent methanol and 12 per cent water was continuously introduced in a downwardly direction at a space velocity of 0.35 per hour into an apparatus of the type employed in Example I. The hydrogenation chambers of the apparatus were filled with a pelleted black nickel catalyst of the type previously described. A hydrogen pressure varying from 1000 to 1500 pounds was maintained throughout the reduction while the major portion of the hydrogenation was effected at a temperature of 40–45° C. When the reduction neared completion, however, the temperature was slowly increased to 80° C., at which value hydrogenation was continued until absorption of hydrogen ceased. As the crude 2-amino-2-methyl-1-propanol was produced, it was withdrawn from the bottom of the reaction vessel through a suitable draw-off tube to a separator from which the excess hydrogen was vented to the atmosphere through a valve located at the top of said separator and the liquid product bled off to atmospheric pressure through a valve at the bottom of the separator. The crude product, thus obtained, was then distilled at atmospheric pressure, and the fraction boiling at 158–163° C., collected. This portion consisted of substantially pure 2-amino-2-methyl-1-propanol and amounted to a yield of 49.2 per cent.

It will be obvious to those skilled in the art, from the above description, that I have made a fundamental advance in the field of continuous catalytic liquid phase hydrogenation as applied to the aliphatic nitrohydroxy compounds. This statement is made because of the fact, that in the relatively obscure and restricted field of organic compounds to which the aliphatic nitrohydroxy compounds belong, it has not previously been possible to successfully hydrogenate such materials in a continuous manner. Also, the continuous process of my invention is not only valuable, from the standpoint of decreasing operating costs in the hydrogenation of such compounds, but it has frequently been the case that yields have been obtained which are an improvement over those secured by the batch or discontinuous process.

As mentioned, I do not wish to be limited in any manner by the procedure outlined in the general description, or in the above example. Many variations or equivalents in my process, will readily occur to those skilled in the art; therefore, it is to be understood that such variations or equivalents are also included within the scope of my invention.

What I claim is:

1. In the continuous hydrogenation of nitrohydroxy compounds, the process which comprises mixing a solution of a nitrohydroxy compound in an inert solvent with an excess of hydrogen, continuously passing the resulting mixture under elevated pressures ranging from about 500 to 2000 pounds per square inch in an upward direction through a series of hydrogenating zones filled with pellets of an inert character impregnated with a hydrogenation catalyst, maintaining the first of said zones at a temperature of about 40° to 55° C., and the final zone at a temperature of about 80° to 100° C., and recovering the resulting amino alcohol.

2. In the continuous hydrogenation of nitrohydroxy compounds, the process which comprises mixing a solution of a nitrohydroxy compound in an inert solvent with an excess of hydrogen, continuously passing the resulting mixture under elevated pressures ranging from about 500 to 2000 pounds per square inch in an upward direction through a series of hydrogenating zones filled with pellets of an inert character impregnated with a black nickel catalyst, maintaining the first of said zones at a temperature of about 40° to 55° C., and the final zone at a temperature of about 80° to 100° C., and recovering the resulting amino alcohol.

3. In the continuous hydrogenation of nitrohydroxy compounds, the process which comprises mixing a solution of a nitrohydroxy compound in an inert solvent with an excess of hydrogen, continuously passing the resulting mixture under elevated pressures ranging from about 500 to 2000 pounds per square inch in an upward direction through a series of hydrogenating zones filled with pellets of an inert carrier impregnated with a reduced black nickel catalyst having a catalyst activity of 1.6–1.8, maintaining the first of said zones at a temperature of about 40° to 45° C., and the final zone at a temperature of about 80° to 100° C., and recovering the resulting amino alcohol.

4. In the continuous hydrogenation of nitrohydroxy compounds, the process which comprises mixing a solution of a nitrohydroxy compound in an inert solvent with an excess of hydrogen, continuously passing the resulting mixture under pressures ranging from about 500 to 2000 pounds per square inch in an upward direction through a series of hydrogenating zones filled with pellets of an inert carrier impregnated with a reduced black nickel catalyst having a catalyst activity of 1.6–1.8, whose concentration is between about 1 and 10 moles per liter, maintaining the first of said zones at a temperature of about 40° to 45° C., and the final zone at a temperature of about 80° to 100° C., and recovering the resulting amino alcohol.

5. In the continuous hydrogenation of 2-nitro-2-methyl-1-propanol, the process which comprises mixing a solution of said 2-ntiro-2-methyl-1-propanol in an inert solvent with an excess of hydrogen, continuously passing the resulting mixture under pressures ranging from about 500 to 2000 pounds per square inch in an upward direction through a series of hydrogenating zones filled with pellets of an inert carrier impregnated with a reduced black nickel catalyst having a catalyst activity of 1.6–1.8, whose concentration is between about 1 and 10 moles per liter, maintaining the first of said zones at a temperature of about 40° to 45° C., and the final zone at a temperature of about 80° to 100° C., and recovering the resulting 2-amino-2-methyl-1-propanol.

6. In the continuous hydrogenation of nitrohydroxy compounds, the process which comprises mixing a solution of a nitrohydroxy compound in an inert solvent comprising methanol and water with an excess of hydrogen, continuously passing the resulting mixture under pressures ranging from about 500 to 2000 pounds per square inch in an upward direction through a series of hydrogenating zones filled with pellets of an inert carrier impregnated with a reduced black nickel catalyst having a catalyst activity of 1.6–1.8, whose concentration is between about 1 and 10 moles per liter, maintaining the first of said zones at a temperature of about 40° to 55° C., and the final zone at a temperature of about 80° to 100° C., and recovering the resulting amino alcohol.

7. In the continuous hydrogenation of 2-nitro-2-methyl-1,3-propanediol, the process which comprises mixing a solution of said 2-nitro-2-methyl-1,3-propanediol in an inert solvent with an excess of hydrogen, continuously passing the resulting mixture under pressures ranging from about 500 to 2000 pounds per square inch in an upward direction through a series of hydrogenating zones filled with pellets of an inert carrier impregnated with a black reduced nickel catalyst having a catalyst activity of 1.6–1.8, whose concentration is between about 1 and 10 moles per liter, maintaining the first of said zones at a temperature of about 40° to 55° C., and the final zone at a temperature of about 80° to 100° C., and recovering the resulting 2-amino-2-methyl-1,3-propanediol.

8. In the continuous hydrogenation of 5-nitro-4-octanol, the process which comprises mixing a solution of said 5-nitro-4-octanol in an inert solvent with an excess of hydrogen, continuously passing the resulting mixtures under pressures ranging from about 500 to 2000 pounds per square inch in an upward direction through a series of hydrogenating zones filled with pellets of an inert carrier impregnated with a black reduced nickel catalyst having a catalyst activity of 1.6–1.8, whose concentration is between about 1 and 10 moles per liter, maintaining the first of said zones at a temperature of about 40° to 55° C., and the final zone at a temperature of about 80° to 100° C., and recovering the resulting amino alcohol.

WALTER K. O'LOUGHLIN.